United States Patent
Hansen et al.

(10) Patent No.: US 9,879,407 B2
(45) Date of Patent: Jan. 30, 2018

(54) FAUCET HANDLE FITTING

(71) Applicant: Kohler Co., Kohler, WI (US)

(72) Inventors: David E. Hansen, Howards Grove, WI (US); Perry D. Erickson, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 72 days.

(21) Appl. No.: 14/961,283

(22) Filed: Dec. 7, 2015

(65) Prior Publication Data

US 2016/0168831 A1  Jun. 16, 2016

Related U.S. Application Data (60) Provisional application No. 62/091,174, filed on Dec. 12, 2014.

(51) Int. Cl.
| | |
|---|---|
| *F16K 11/078* | (2006.01) |
| *E03C 1/04* | (2006.01) |
| *F16K 27/04* | (2006.01) |
| *E03C 1/02* | (2006.01) |

(52) U.S. Cl.
CPC .......... *E03C 1/0412* (2013.01); *E03C 1/0403* (2013.01); *F16K 27/045* (2013.01); *E03C 2001/026* (2013.01); *Y10T 137/86815* (2015.04); *Y10T 137/86823* (2015.04)

(58) Field of Classification Search
CPC ....... Y10T 137/5196; Y10T 137/86815; Y10T 137/86823
See application file for complete search history.

(56) References Cited

U.S. PATENT DOCUMENTS

| | | | |
|---|---|---|---|
| 4,423,752 A * | 1/1984 | Psarouthakis | F16K 11/022 137/270 |
| 4,559,966 A | 12/1985 | Massey et al. | |
| 4,901,749 A | 2/1990 | Hutto | |
| 5,402,819 A * | 4/1995 | Bosio | F16K 11/0787 137/270 |
| 5,647,389 A | 7/1997 | Holloway | |
| 5,732,734 A | 3/1998 | Buccicone | |
| 5,806,552 A * | 9/1998 | Martin, Jr. | F16K 11/0782 137/270 |
| 5,893,386 A | 4/1999 | Caria et al. | |
| 6,029,692 A | 2/2000 | Barber | |
| 6,237,622 B1 | 5/2001 | Cook et al. | |
| 6,293,299 B1 | 9/2001 | Nelson | |
| 7,987,869 B2 | 8/2011 | Rosko et al. | |
| 2006/0266424 A1* | 11/2006 | Filtness | E03C 1/0403 137/625.4 |

(Continued)

FOREIGN PATENT DOCUMENTS

DE  202014101116  4/2014

OTHER PUBLICATIONS

European Search Report dated May 4, 2016 regarding EP Application No. 15198777.3.

*Primary Examiner* — R. K. Arundale
(74) *Attorney, Agent, or Firm* — Foley & Lardner LLP (57) ABSTRACT

A fitting for a faucet handle includes a body having an interior wall disposed within the body, the interior wall having a plurality of apertures. Each aperture has at least a first opening and a second opening fluidly connected by a channel, and the first opening is angularly offset relative to the second opening.

20 Claims, 8 Drawing Sheets (56) References Cited

U.S. PATENT DOCUMENTS

| | | |
|---|---|---|
| 2007/0145319 A1 | 6/2007 | Hoernig |
| 2012/0018009 A1* | 1/2012 | Veros .................... E03C 1/04 137/454.2 |
| 2012/0273075 A1 | 11/2012 | Pitsch et al. |
| 2013/0056664 A1* | 3/2013 | Huang ................ F16K 11/0787 251/231 |
| 2014/0048145 A1 | 2/2014 | Chong et al. |
| 2016/0326731 A1* | 11/2016 | Lange ................ F16K 11/0787 |

* cited by examiner

FIG. 8A

FAUCET HANDLE FITTING

CROSS-REFERENCE TO RELATED PATENT APPLICATIONS

This application claims priority to and the benefit of U.S. Provisional Patent Application No. 62/091,174 filed Dec. 12, 2014, the entire disclosure of which is incorporated by reference herein.

BACKGROUND

The present application relates generally to the field of faucets (e.g., kitchen faucets, bathroom faucets, etc.), and specifically to faucets that include features that are intended to allow an installer or user to modify the range of motion (e.g., range of rotation) of faucet handles. According to one particular configuration, such faucets include fittings (e.g., adapter fittings, adapter sleeves, etc.) that may be swapped out to modify the range of motion of the faucet handles.

SUMMARY

According to an exemplary embodiment, a fitting for a faucet handle includes a body having an interior wall disposed within the body, the interior wall having a plurality of apertures. Each aperture has at least a first opening and a second opening fluidly connected by a channel. The first opening is angularly offset relative to the second opening.

According to another exemplary embodiment, a faucet assembly includes a fitting. The fitting includes a body having an interior wall disposed within the body, the interior wall having a plurality of apertures. Each aperture has at least a first opening and a second opening fluidly connected by a channel. The first opening is angularly offset relative to the second opening. The faucet assembly also includes a valve fluidly connected to the fitting. The faucet assembly also includes a handle coupled to the valve. The valve regulates a fluid flowing from at least one fluid source to a faucet outlet based on the orientation of the handle.

According to another exemplary embodiment, a method of modifying a range of motion for a faucet handle includes removing a first faucet handle fitting from a faucet assembly and replacing the first faucet handle fitting with a second faucet handle fitting. The second faucet handle fitting defines a range of motion for the faucet handle that differs from a range of motion defined by the first faucet handle fitting.

DETAILED DESCRIPTION

Faucets for use in kitchen, bathroom, or other applications typically include one or more handles that may be moved or rotated to control operation of the faucet, for example, to control or change the flow rate and/or the temperature of water leaving the faucet. In some installations, however, the available space around the faucet may constrain the movement of the faucet handles. For example, in some kitchen installations, a backsplash or wall provided behind the faucet may interfere with or prevent the faucet handle from enjoying its full range of motion, which may limit the ability of a user to take full advantage of the faucet controls. Accordingly, installers must either position the faucet sufficiently forward of the rear wall or backsplash to allow the faucet to enjoy its full range of motion or the faucet handle will contact the rear wall or backsplash, leading to decreased functionality for the faucet and potentially increased consumer dissatisfaction.

Various embodiments herein are directed to a faucet that includes features to allow the associated faucet controls to enjoy their full range of motion in a variety of installations, and may be modified as necessary at an installation site in a relatively simple and efficient manner to ensure that the faucet retains its full functionality even when the installation area would normally constrain the operation of the faucet controls.

According to an exemplary embodiment, an improved faucet assembly includes a removable or replaceable handle fitting or sleeve that allows a user or installer to modify the range of motion of a faucet handle as may be desired for a given application. For example, in a first configuration, a faucet handle may be configured to rotate approximately 90 degrees (e.g., between a first position halfway between the 12:00 and 3:00 positions, and a second position halfway between the 12:00 and 9:00 positions) during operation. If such rotation is not suitable for a particular application (e.g., because a rear wall or backsplash may interfere with the faucet handle rotating rearwardly past the 12:00 position), the handle fitting may be removed and replaced with an alternative handle fitting that modifies the range of motion of the faucet handle so that it is in a more suitable configuration for the given application (e.g., such that the faucet handle retains its full functionality but instead rotates between the 12:00 and 9:00 positions, such that the full range of motion doesn't go rearwards past the 12:00 position). By using the improved faucet handle fitting configuration disclosed in this application, a faucet assembly may be installed relatively close to a rear wall or a backsplash without limiting the range of rotation of a faucet handle coupled to the improved faucet handle fitting. Thus, a clearance behind a faucet assembly utilizing the improved faucet handle fitting may be smaller than the clearance required to allow a faucet with a conventional faucet handle assembly to move through its full range of rotation.

Figure 1:
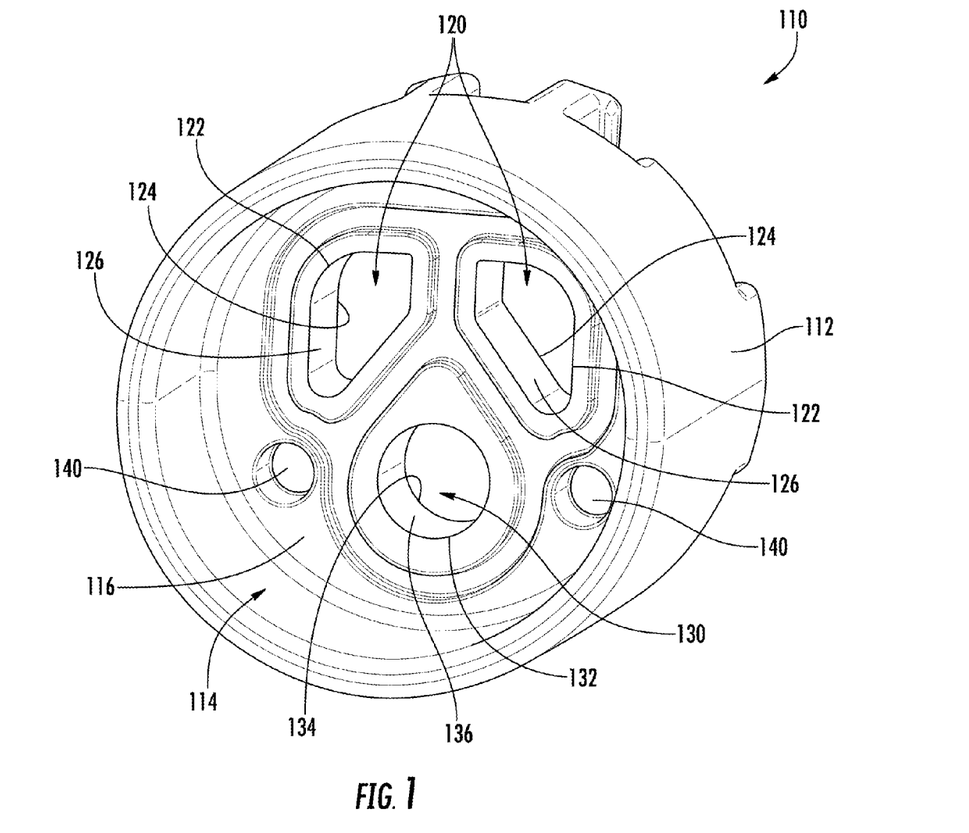
FIG. 1 illustrates a front perspective view of a faucet handle fitting for a faucet assembly, according to an exemplary embodiment.

Referring to FIG. 1, a front side of a faucet handle fitting 110 is shown. Although not shown in FIG. 1, the faucet handle fitting 110 and an associated valve (e.g., a mixing valve) (not shown) are configured to be received within a portion of a faucet body. The faucet handle fitting 110 and the valve may be coupled to the faucet in any suitable way. For example, a side port of a faucet may include inner threads, and a fastener (e.g., a nut) may include corresponding outer threads. Thus, the nut may be fastened onto a side port in order to retain the faucet handle fitting 110 and a valve therein. Although not shown in the FIGURES, the faucet handle fitting 110 is configured to be positioned within a faucet body so that the front side of the faucet handle fitting 110 is coupled to (e.g., abuts against) a valve and an opposite rear side (see, e.g., FIG. 2) of the faucet handle fitting 110 is coupled to a waterway connector (see, e.g., FIGS. 4A and 4B). The faucet handle fitting 110 is configured to remain fixed in place within the faucet, and the valve rotates relative to the faucet handle fitting 110 in order to allow water to flow therethrough.

As shown in FIG. 1, the faucet handle fitting 110 may have a body that is generally cylindrical. The front side of the faucet handle fitting 110 may include a side wall 112 that defines a bore 114. A valve such as a mixing valve (not shown) and the bore 114 may be cooperatively configured such that at least a portion of the valve is received within the bore 114. Also, an outer diameter of the side wall 112 and an inner diameter of the faucet body may be cooperatively configured such that the faucet handle fitting 110 fits snugly within the faucet body and does not rotate when installed therein. In other words, the faucet handle fitting 110 and a faucet body may be cooperatively configured such that there is a relatively small clearance therebetween in order to reduce or limit movement of the faucet handle fitting 110 relative to the faucet body.

The faucet handle fitting 110 is further shown to include an interior wall 116 which functions as a partition and divides the front and rear sides of the faucet handle fitting 110. A plurality of apertures (e.g., holes, openings, etc.) may extend through the interior wall 116 and between the front and rear sides of the faucet handle fitting 110. As shown in FIG. 1, the interior wall 116 may include three or more apertures disposed therein. In particular, the faucet handle fitting 110 may include two inlet apertures 120 and one outlet aperture 130. Each inlet aperture 120 may be coupled to a separate water supply (e.g., a hot water supply and a cold water supply). In another exemplary embodiment, the faucet handle fitting 110 may include two apertures (one inlet aperture 120 and one outlet aperture 130). Although the inlet apertures 120 and the outlet aperture 130 are shown as having a particular shape, it should be understood that the shape of the apertures disposed within the interior wall 116 may have any suitable shape.

The faucet handle fitting 110 may be made from any suitable material. For example, the faucet handle fitting 110 may be made of metal, brass, stainless steel, composite, a polymeric material (plastic), polyphenylsulfate, etc.

Referring still to FIG. 1, the front side of the faucet handle fitting 110 may further include a plurality of divots 140 (e.g., depressions, recessions, etc.) used to orient or position a mixing valve (not shown) relative to the faucet handle fitting 110. For example, the mixing valve may include a plurality of lugs (not shown, but, e.g., members, tabs, etc.) that are configured to be received within the divots 140 in order to orient the mixing valve relative to the faucet handle fitting 110. The divots 140 and corresponding lugs on the mixing valve may also aid in constraining the mixing valve to the faucet handle fitting 110 as a torque is applied to a faucet handle 310. Although two divots 140 are shown in FIG. 1, the faucet handle fitting 110 may include more or fewer divots, according to other exemplary embodiments. Further, in an exemplary embodiment, the faucet handle fitting 110 may include lugs, and the mixing valve may include divots used to position the elements with respect to each other. While lugs and divots are used to disclose how a faucet handle fitting may be positioned relative to the mixing valve, it should be understood that other features may be used to accomplish this purpose. For example, the bore 114 may include a protrusion or keyed slot that is paired with a corresponding feature on the mixing valve.

Figure 2:
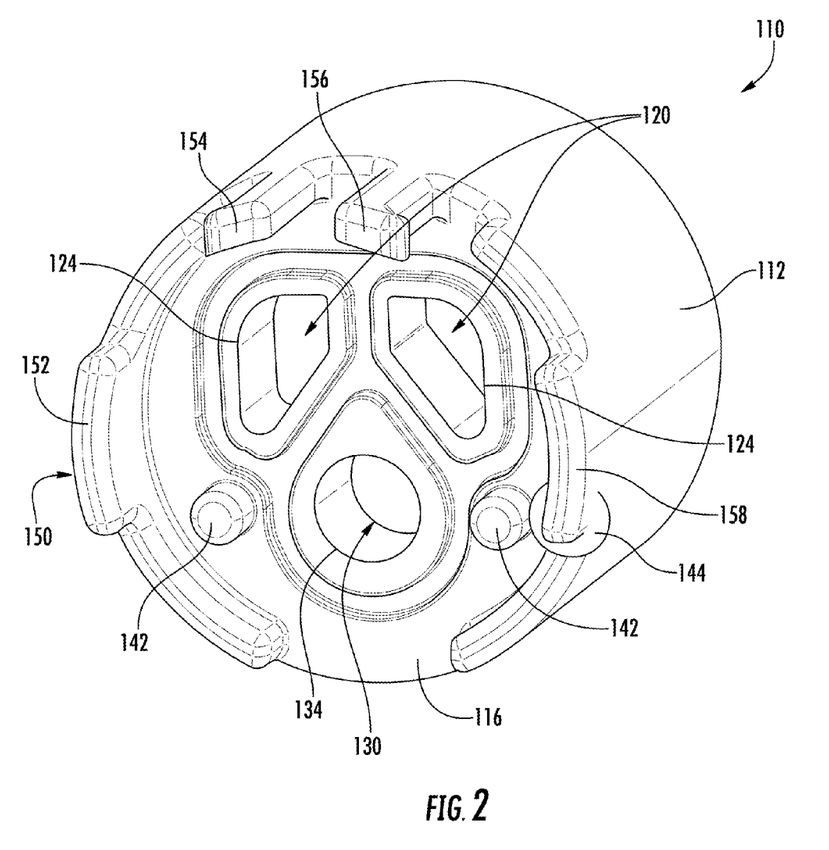
FIG. 2 illustrates a rear perspective view of the faucet handle fitting shown in FIG. 1, according to an exemplary embodiment.

Referring now to FIG. 2, the opposite rear side of the faucet handle fitting 110 is shown. The rear side of the faucet handle fitting 110 is configured to be coupled to a waterway connector 320 (not shown in FIG. 2, but see, e.g., FIG. 3). In an exemplary embodiment, the rear side of the faucet handle fitting 110 may include one or more arms 150 (e.g., tabs, members, etc.) that extend from the body of the faucet handle fitting 110, orthogonal to the interior wall 116. The one or more arms 150 may be configured to be received within or between corresponding features of the waterway connector 320. In an exemplary embodiment, arms 152 and 158 may be received within one or more recessions 328 provided in the right and left sides of the waterway connector, respectively, and arms 154 and 156 may be received within a slot provided in an upper surface of the waterway connector 320. Further, the arms 154 and 156 may include one or more flanges that extend laterally outward and engage a rear surface of the waterway connector 320, in order to secure the faucet handle fitting 110 to the waterway connector 320. According to another exemplary embodiment, the arms 154 and 156 may be replaced by a single arm.

Still referring to FIG. 2, the rear side of the faucet handle fitting 110 may include a plurality of lugs 142. Specifically, as shown in FIG. 2, the faucet handle fitting 110 may have two lugs 142. The lugs 142 may be configured to receive (e.g., engage) corresponding divots (not shown, but e.g., recessions, holes, etc.) within the waterway connector 320. The lugs 142 may be used to further constrain the faucet handle fitting 210 in a fixed relationship with the waterway connector 320.

Figure 3:
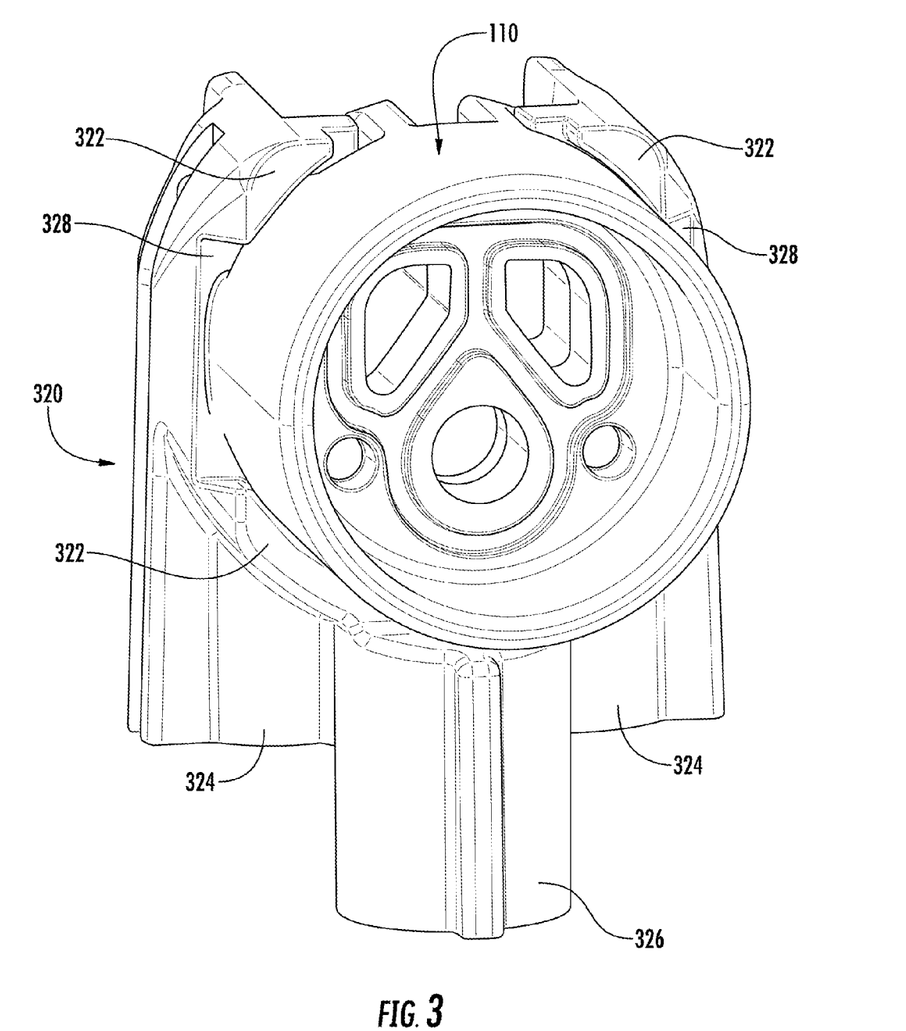
FIG. 3 illustrates a waterway connector that is coupled to the faucet handle fitting shown in FIG. 1, according to an exemplary embodiment.

Referring now to FIG. 3, the waterway connector 320 is shown to include a plurality of retainers 322. The retainers 322 are configured to receive the faucet handle fitting 110 within the waterway connector 320. In other words, the retainers 322 may be configured to engage an outer radial surface of the faucet handle fitting 110 in order to further secure the faucet handle fitting 110 to the waterway connector 320. The waterway connector 320 may also include at least one water source 324. Specifically, the waterway connector 320 may include two water sources 324. In an exemplary embodiment, at least two water sources 324 may provide water at different temperatures. The waterway connector 320 may also include at least one water exit 326. The at least one water exit 326 may be configured to be fluidly connected to a faucet spout (not shown).

Still referring to FIG. 3, the faucet handle fitting 110 is shown to be coupled to the waterway connector 320. The waterway connector 320 may be configured to be coupled to a plurality of water supply lines (not shown, but e.g., a cold water supply line and a hot water supply line). The faucet handle fitting 110 and the waterway connector 320 may be cooperatively configured so that the faucet handle fitting 110 is fixed in place when coupled to the waterway connector 320. For example, the side wall 112 may include a protrusion 144 or keyed slot that is paired with a corresponding feature on the waterway connector 320. It should also be understood that the faucet handle fitting 110 may be fixed in place when coupled to the waterway connector 320 in other ways.

According to an exemplary embodiment shown in FIGS. 1-3, the faucet handle fitting 110, waterway connector 320, mixing valve (not shown), and the faucet handle 310 (see, e.g., FIGS. 4A and 4B) may be cooperatively configured so that when the faucet handle 310 is rotated in a first direction approximately forty-five degrees relative to a 12:00 position (see, e.g., FIG. 4A), only cold water flows through the mixing valve, and when the faucet handle 310 is rotated in an opposite second direction approximately forty-five degrees relative to a 12:00 position (see, e.g., FIG. 4B), only hot water flows through the mixing valve. Mixed hot and cold water may flow in at least one position between the hot and cold positions.

Referring to FIGS. 1 and 2 together, each inlet aperture 120 may include an inlet front opening 122 and an inlet rear opening 124, fluidly coupled by an inlet channel 126. The inlet front opening 122 may be disposed at a front side of the interior wall 116 and the inlet rear opening 124 may be disposed at a rear side of the interior wall 116. In an exemplary embodiment, the inlet front opening 122 and the inlet rear opening 124 may be angularly aligned. The inlet channel 126 may extend through the interior wall 116. Specifically, the inlet channel 126 may be orthogonal to the interior wall 116.

Still referring to FIGS. 1 and 2 together, each outlet aperture 130 may include an outlet front opening 132 and an outlet rear opening 134, fluidly coupled by an outlet channel 136. The outlet front opening 132 may be disposed at a front side of the interior wall 116 and the outlet rear opening 134 may be disposed at a rear side of the interior wall 116. In an exemplary embodiment, the outlet front opening 132 and the outlet rear opening 134 may be angularly aligned. The outlet channel 136 may extend through the interior wall 116. Specifically, the outlet channel 136 may be orthogonal to the interior wall 116.

Although not shown in the FIGURES, the mixing valve (not shown) that may include a fixed disk (not shown) and a rotatable disk (not shown). The fixed disk and/or the rotatable disk may be ceramic. Movement of the faucet handle 310 controls the orientation of the rotatable disk relative to the fixed disk, thus controlling the amount of water able to flow between a plurality of water supply lines and the mixing valve.

Figure 5:
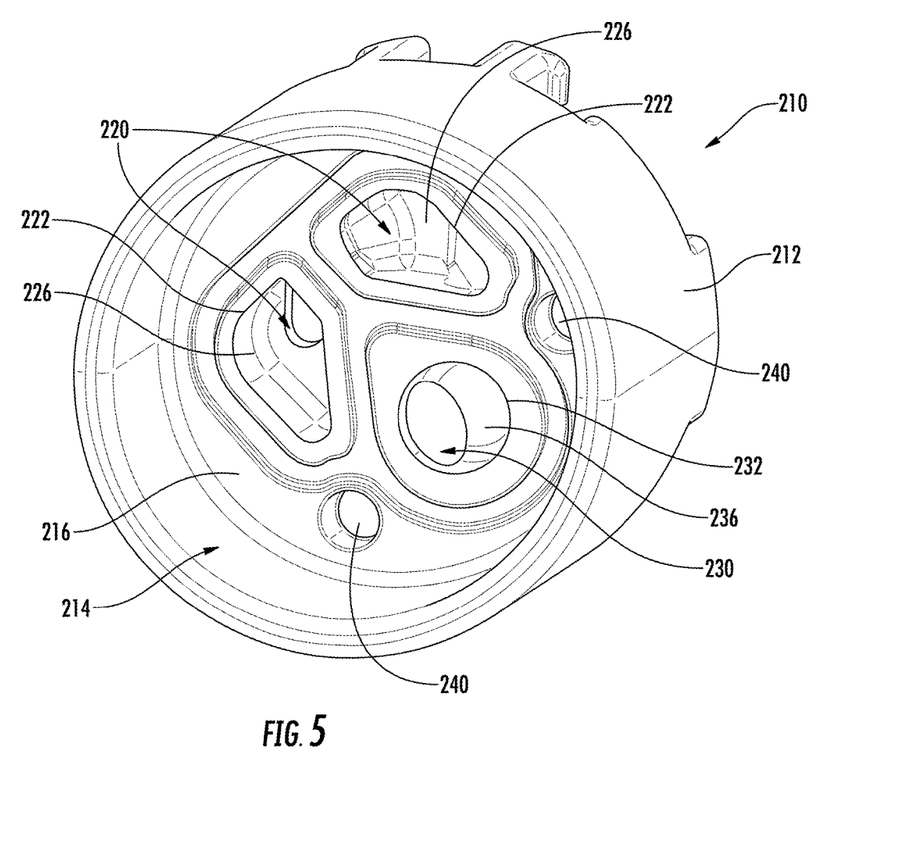
FIG. 5 illustrates a front perspective view of a faucet handle fitting, according to an exemplary embodiment.

Referring now to FIG. 5, a front side of the faucet handle fitting 210 is shown, according to an exemplary embodiment. The front side of the faucet handle fitting 210 shares a similar configuration with the front side of the faucet handle fitting 110. For example, as explained above, the body of the faucet handle fitting 210 may be substantially cylindrical. A bore 214 may be defined by the side wall 212 of the faucet handle fitting 210. A mixing valve (not shown) and the bore 214 may be cooperatively configured such that at least a portion of the mixing valve is received within the bore 214. An interior wall 216 may be disposed (e.g., provided) between the front and rear sides of the faucet handle fitting 210. Further, similar to the faucet handle fitting 110, the front side of the faucet handle fitting 210 includes a plurality of apertures (e.g., holes, openings, etc.). In particular, two inlet apertures 220 and an outlet aperture 230 may be disposed within the front side of the faucet handle fitting 210. As can be seen in FIGS. 1 and 5, the profile of the inlet apertures 220 and the outlet aperture 230 may be substantially similar to the profile of the inlet apertures 120 and the outlet aperture 130, respectively.

Figure 6:
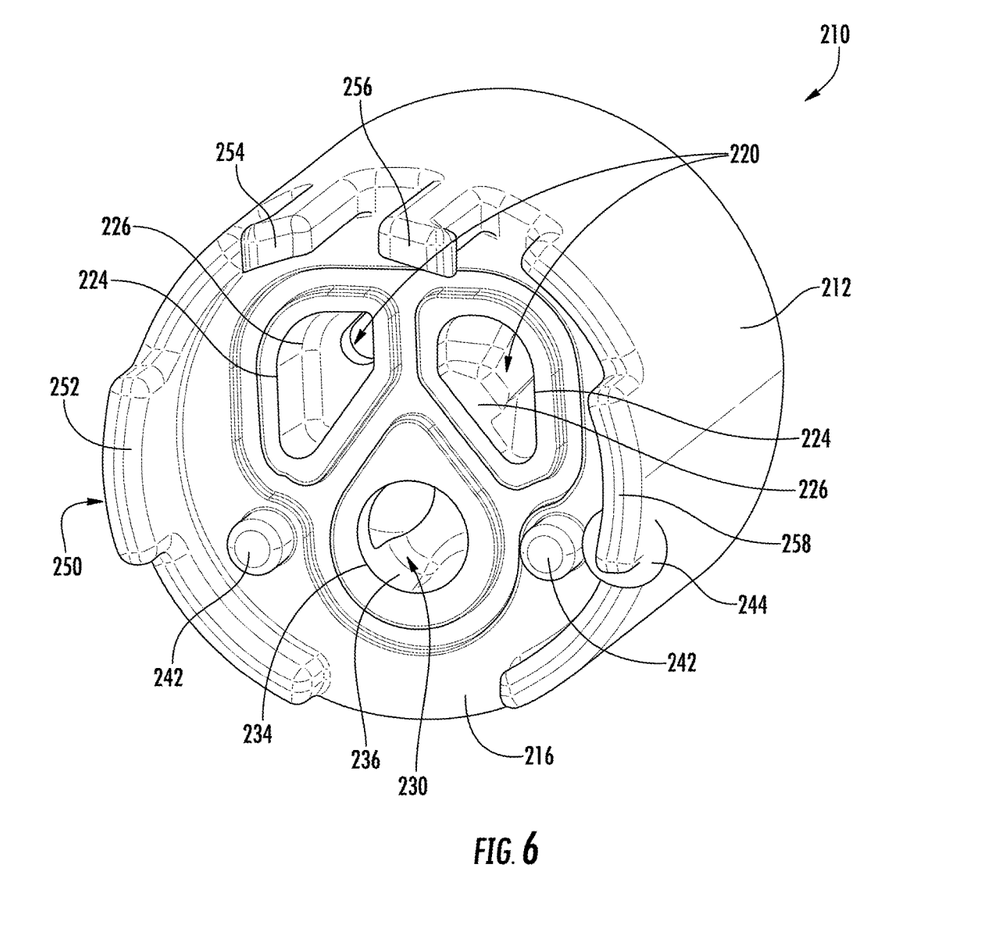
FIG. 6 illustrates a rear perspective view of the faucet handle fitting shown in FIG. 5, according to an exemplary embodiment.

Referring now to FIG. 6, according to an exemplary embodiment, a rear side of a faucet handle fitting 210 is shown. Similar to the faucet handle fitting 110 in FIGS. 1-3, the faucet handle fitting 210 in FIGS. 5-7 has a generally cylindrical body that defines a side wall 212. Further, the faucet handle fitting 210 is configured to be received within a portion of a faucet body (not shown, but, e.g., a side port of a faucet body) and/or waterway connector 320. For example, an outer diameter of the body of the faucet handle fitting 210 and an inner diameter of the faucet body and/or waterway connector 320 may be cooperatively configured such that the faucet handle fitting 210 fits snugly within either the faucet body and/or waterway connector 320. In other words, there may be a small clearance between the faucet handle fitting 210 and either the faucet body and/or the waterway connector 320 in order to limit or reduce movement of the faucet handle fitting 210 relative to the faucet body and/or the waterway connector 320.

Similar to the faucet handle fitting 110, the faucet handle fitting 210 may be made from any suitable material. For example, the faucet handle fitting 210 may be made of metal, brass, stainless steel, composite, a polymeric material (plastic), polyphenylsulfate, etc.

Still referring to FIG. 6, the rear side of the faucet handle fitting 210 includes a plurality of apertures (e.g., holes, openings, etc.). In particular, two inlet apertures 220 and an outlet aperture 230 may be disposed within the rear side of the faucet handle fitting 210. As can be seen in FIGS. 2 and 6, the profile of the inlet apertures 220 and the outlet aperture 230 may be substantially similar to the profile of the inlet apertures 120 and the outlet aperture 130, respectively. However, it should be understood that the inlet apertures 220 and the outlet aperture 230 may have any suitable profile, and that the profiles disclosed herein are not limiting. Further, the faucet handle fitting 210 may have more or fewer apertures. For example, the faucet handle fitting 210 may include two apertures (e.g., one inlet aperture 220 and one outlet aperture 230).

Figure 7:
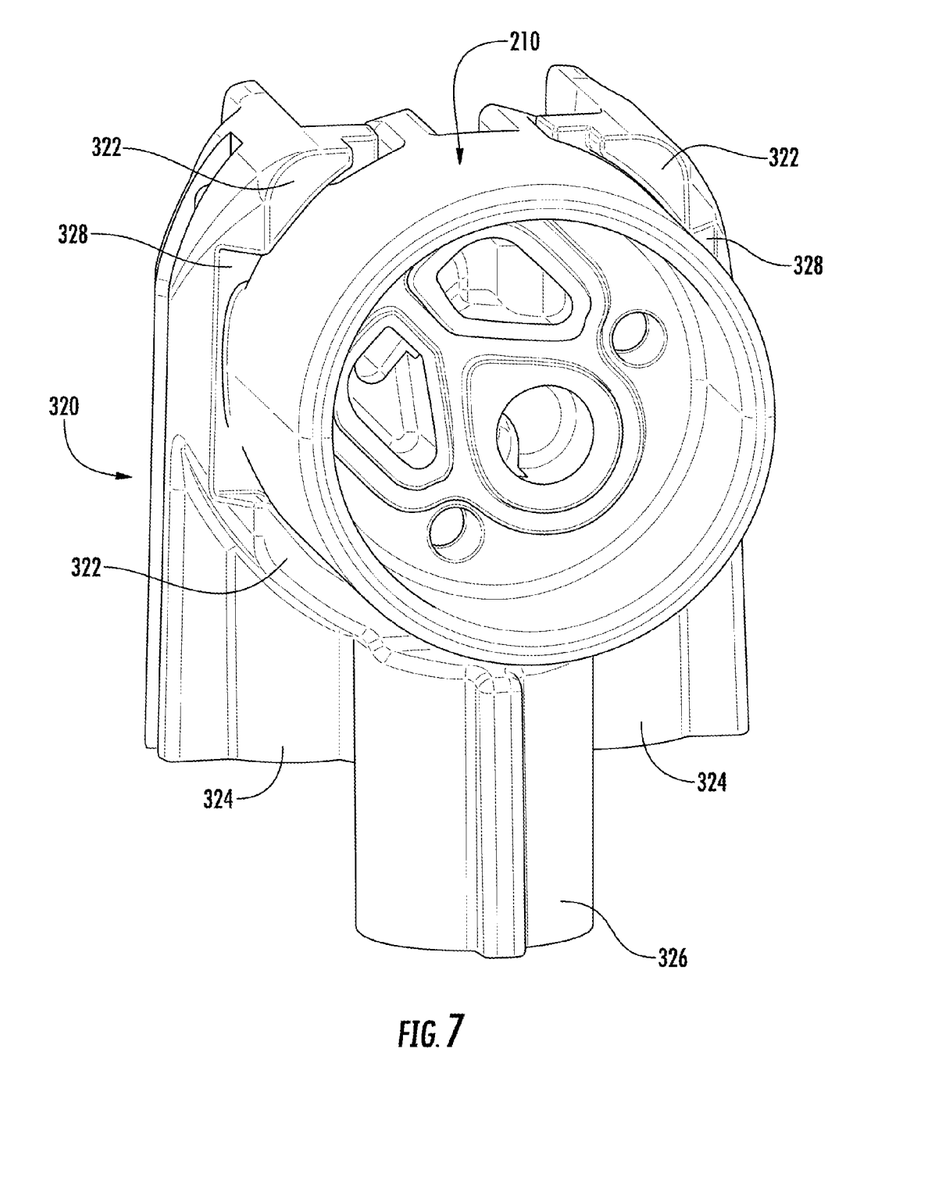
FIG. 7 illustrates a waterway connector that is coupled to the faucet handle fitting shown in FIG. 5, according to an exemplary embodiment.

Still referring to FIG. 6, the rear side of the faucet handle fitting 210 is configured to be coupled to a waterway connector 320 (not shown in FIG. 6, but see, e.g., FIG. 7). In an exemplary embodiment, the rear side of the faucet handle fitting 210 may include one or more arms 250 (e.g., tabs, members, etc.) that extend from the body of the faucet handle fitting 210, orthogonal to the interior wall 216. The one or more arms 250 may be configured to be received within or between corresponding features of the waterway connector 320. In an exemplary embodiment, arms 252 and 258 may be received within one or more recessions 328 provided in the right and left sides of the waterway connector, respectively, and arms 254 and 256 may be received within a slot provided in an upper surface of the waterway connector 320. Further, the arms 254 and 256 may include one or more flanges that extend laterally outward and engage a rear surface of the waterway connector 320, in order to secure the faucet handle fitting 210 to the waterway connector 320. According to another exemplary embodiment, the arms 254 and 256 may be replaced by a single arm.

Referring to FIGS. 5 and 6 together, each inlet aperture 220 may include an inlet front opening 222 and an inlet rear opening 224, fluidly coupled by an inlet channel 226. The inlet front opening 222 may be disposed at a front side of the interior wall 216 and the inlet rear opening 224 may be disposed at a rear side of the interior wall 216. In an exemplary embodiment, the inlet front opening 222 and the inlet rear opening 224 may be angularly offset. Specifically, the inlet front opening 222 may be angularly offset approximately forty-five degrees relative to the inlet rear opening 224. The inlet channel 226 may extend through the interior wall 216. Specifically, the inlet channel 226 may form a generally helical path (e.g., a twisted path, corkscrew path, etc.) through the interior wall 216. It should be noted that the inlet channel 226 may form paths of different shapes. In an exemplary embodiment, the cross-sectional area of the inlet channel 226 may vary slightly along the helical path through the interior wall 216; however, the inlet front opening 222 and the inlet rear opening 224 may have substantially the same cross-sectional areas.

Still referring to FIGS. 5 and 6 together, each outlet aperture 230 may include an outlet front opening 232 and an outlet rear opening 234, fluidly coupled by an outlet channel 236. The outlet front opening 232 may be disposed at a front side of the interior wall 216 and the outlet rear opening 234 may be disposed at a rear side of the interior wall 216. In an exemplary embodiment, the outlet front opening 232 and the outlet rear opening 234 may be angularly offset. Specifically, the outlet front opening 232 may be angularly offset approximately forty-five degrees relative to the outlet rear opening 234. The outlet channel 236 may extend through the interior wall 216. Specifically, the outlet channel 236 may form a generally helical path (e.g., a twisted path, corkscrew path, etc.) through the interior wall 216. It should be noted that the outlet channel 236 may form paths of different shapes. In an exemplary embodiment, the cross-sectional area of the outlet channel 236 may vary slightly along the helical path through the interior wall 216; however, the outlet front opening 232 and the outlet rear opening 234 may have substantially the same cross-sectional areas.

Figure 4A:
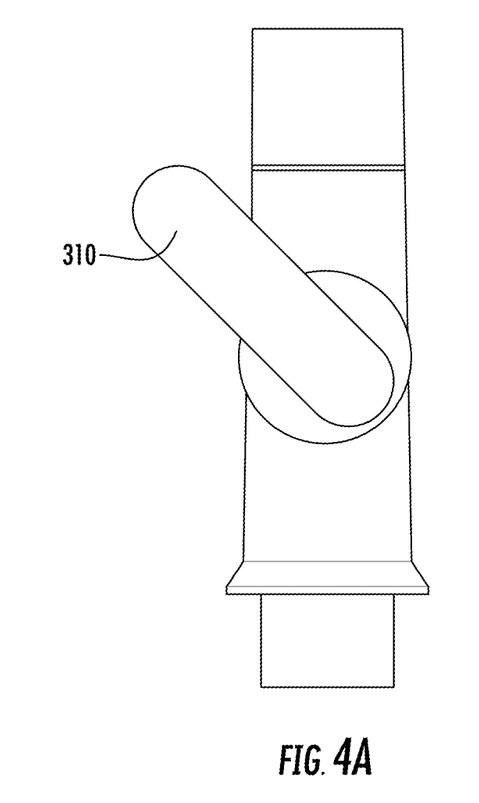
FIG. 4A illustrates a range of rotation in a first direction of a faucet handle that is coupled to the faucet handle fitting shown in FIG. 1, according to an exemplary embodiment.
Figure 4B:
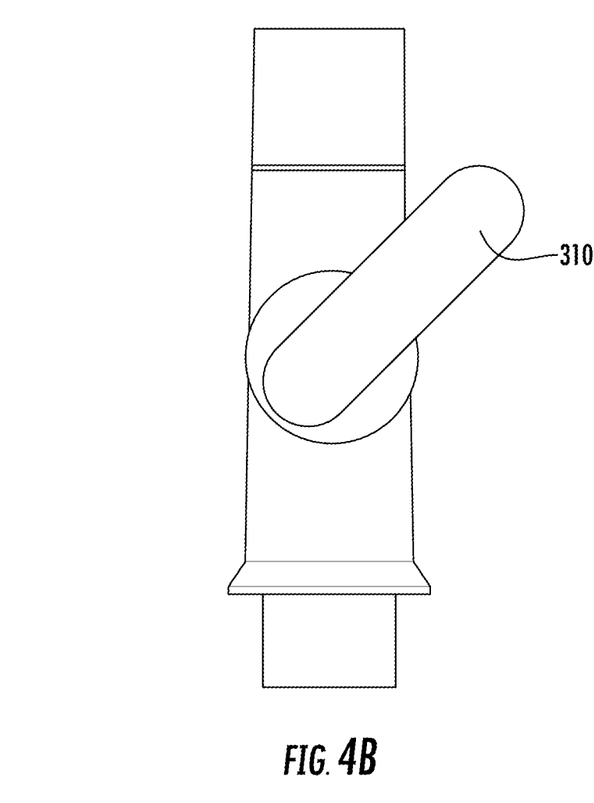
FIG. 4B illustrates a range of rotation in a second direction of a faucet handle that is coupled to the faucet handle fitting shown in FIG. 1, according to an exemplary embodiment.

Because the inlet front opening 222 and the outlet front opening 232 are angularly offset approximately forty-five degrees relative to the inlet rear opening 224 and the outlet rear opening 234 respectively, the faucet handle 310 positions for "Cold" and "Hot" (see, e.g., FIGS. 8A and 8B) may be angularly offset approximately forty-five degrees relative to the corresponding faucet handle 310 positions that would be possible with a faucet assembly that utilizes the faucet handle fitting 110 (see, e.g., FIGS. 4A and 4B). Thus, when the faucet handle 310 is coupled to the faucet handle fitting 210, the faucet handle 310 may be rotated in a first direction to a substantially horizontal (3:00 or 9:00) position for "full cold," and the faucet handle 310 may be rotated in an opposite second direction to the 12:00 position for "full hot." In order to vary the flow of water through the mixing valve, the faucet handle 310 may be rotated (e.g., pivoted) outward away from the faucet or inward toward the faucet.

While the inlet front opening 222 and the outlet front opening 232 are shown to be angularly offset approximately forty-five degrees relative to the inlet rear opening 224 and the outlet rear opening 234 respectively, it should be understood that this angular relationship is not intended to be limiting, and they may angularly offset at any suitable angle, according to other exemplary embodiments. For example, according to an exemplary embodiment, the faucet handle fitting 210 may be configured such that the faucet handle 310 rotates between a bottom, six o'clock ("6:00") position to a forward, horizontal position. According to other exemplary embodiments, the faucet handle fitting 210 may be configured such that the angular offset may be less than, or greater than, forty-five degrees.

Referring to FIG. 5, the front side of the faucet handle fitting 210 may include a plurality of divots 240. Similar to the divots 140 shown in FIG. 1, the divots 240 may be used to orient or position the mixing valve (not shown) relative to the faucet handle fitting 210. For example, the mixing valve may include lugs that correspond to the divots 240. Further, the position of the divots 240 relative to the inlet apertures 220 and outlet aperture 230 may be substantially similar to the position of the divots 140 relative to the inlet apertures 120 and outlet aperture 130. Thus, a standard mixing valve (not shown) may be used with both the faucet handle fittings 110 and 210. The front side of the faucet handle fitting 210 may have more or fewer divots 240, and that the number of divots 240 shown in the FIGURES is not intended to be limiting. Further, in an exemplary embodiment, the faucet handle fitting 110 may include lugs, and the mixing valve may include divots used to position the elements with respect to each other. While lugs and divots are used to position a faucet handle fitting 210 relative to the mixing valve, it should be understood that other features may be used to accomplish this purpose. For example, the bore 214 may include a protrusion or keyed slot that is paired with a corresponding feature on the mixing valve.

Referring to FIG. 6, the rear side of the faucet handle fitting 210 may include a plurality of lugs 242. Specifically, as shown in FIG. 6, the faucet handle fitting 210 may have two lugs 242. The lugs 242 may be configured to receive (e.g., engage) corresponding divots (not shown, but e.g., recessions, holes, etc.) within the waterway connector 320. The lugs 242 may be used to further constrain the faucet handle fitting 210 in a fixed relationship with the waterway connector 320.

Referring now to FIG. 7, the faucet handle fitting 210 is shown to be coupled to the waterway connector 320. As explained previously, the waterway connector 320 may be configured to be coupled to a plurality of water supply lines (not shown, but e.g., a cold water supply line and a hot water supply line). The faucet handle fitting 210 and the waterway connector 320 may be cooperatively configured so that the faucet handle fitting 210 is fixed in place when coupled to the waterway connector 320. For example, the side wall 212 may include a protrusion 244 or keyed slot that is paired with a corresponding feature on the waterway connector 320. It should also be understood that the faucet handle fitting 210 may be fixed in place when coupled to the waterway connector 320 in other ways.

Figure 8A:
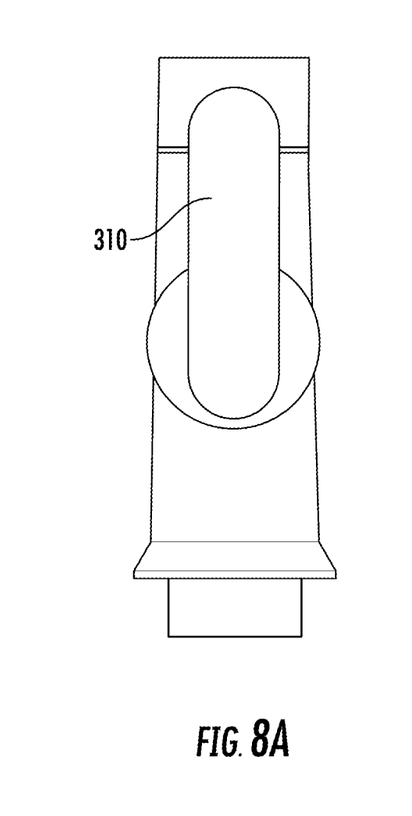
FIG. 8A illustrates a range of rotation in a first direction of a faucet handle that is coupled to the faucet handle fitting shown in FIG. 5, according to an exemplary embodiment.
Figure 8B:
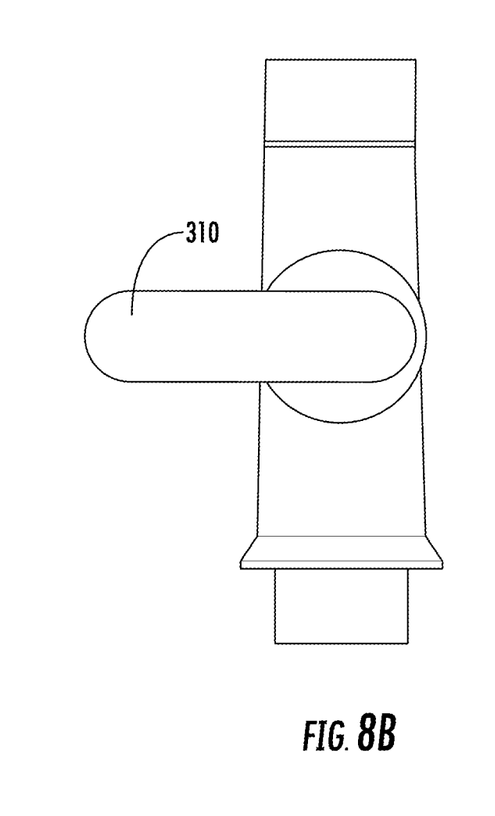
FIG. 8B illustrates a range of rotation in a second direction of a faucet handle that is coupled to the faucet handle fitting shown in FIG. 5, according to an exemplary embodiment.

Referring now to FIGS. 8A and 8B, according to an exemplary embodiment, the same faucet handle 310 may be used with both faucet handle fitting 110 and faucet handle fitting 210 (see also, FIGS. 4A and 4B). Advantageously, the improved faucet handle fitting design only modifies the orientations that the mixing valve (not shown) and the faucet handle 310 are coupled to the faucet assembly. Thus, similar standard hardware (e.g., fasteners, seals, etc.) and similar methods may be used to couple the faucet handle 310 to either the faucet handle fitting 110 or the faucet handle fitting 210.

Advantageously, when a faucet assembly that includes a faucet handle fitting 210 received within a faucet spout body (not shown) is installed relatively close to a rear wall (not shown, but e.g., a backsplash), the rear wall will not interfere with the possible range of rotation of the faucet handle 310. Therefore, the faucet handle 310 may be rotated from an "off" position to either the "full hot" or "full cold" positions without hitting the rear wall.

Accordingly, in a situation where a faucet is to be installed in an area that would result in a constrained range of motion for the faucet handle 310, the installer may remove a first faucet handle fitting (e.g., faucet handle fitting 110) and replace it with a second faucet handle fitting having a different configuration (e.g., faucet handle fitting 210) to allow the faucet handle 310 to have a different range of motion adapted for the installation location such that the faucet handle 310 does not contact a vertical surface (e.g., a rear wall or backsplash). The swapping of faucet handle fittings may be accomplished in a relatively quick and efficient manner, and allows faucet manufacturers to produce a single faucet design configurable for different ranges of motion for its faucet handle instead of producing separate designs for different installation conditions. The replacement of the first faucet handle fitting 110 with the second faucet handle fitting 210 may allow the range of motion to be changed from the range of motion shown in FIGS. 4A and 4B to the range of motion shown in FIGS. 8A and 8B, for example (although, as described herein, other ranges of motion are also possible according to various other exemplary embodiments).

The replaceable faucet handle fittings may be used for a wide variety of faucet applications, including, for example, kitchen and bathroom faucets, lavatory faucets, utility sink faucets, tub fillers, pot fillers, and any of a variety of other types of faucet configurations. Additionally, although the present disclosure has discussed only two examples of different faucet handle fittings to allow a user or installer to change between two different faucet handle configurations, it should be understood that other faucet handle fitting configurations are also possible to allow different ranges of motion for the faucet handles than has been discussed in the present application, and that the concept of removable/replaceable faucet handle fittings, regardless of the particular configuration or range of motion, is intended to fall within the scope of the present disclosure.

In addition to the benefits described above, the replaceable faucet handle fittings may also allow for the production of single-handle faucets that can be oriented with the faucet handle on either the left side or the right side of a faucet. For example, in a particular faucet configuration, the single handle for controlling the flow rate and temperature may be positioned such that it is located on the right side of the faucet for operation by a right-handed user. If the faucet is relatively symmetrical, however, and the faucet spout may be rotated 360 degrees, then a user may prefer for the control handle to be located on the left side of the faucet spout. In such a circumstance, the faucet handle fitting may be exchanged in favor of one having a configuration that would allow the left-handed faucet handle orientation to operate similarly to the manner in which it would operate on the right side of the faucet spout (e.g., reversing the operation of the handle so that it functions similarly on the left side).

According to an exemplary embodiment, a fitting for a faucet handle includes a front surface configured to be coupled to a valve. The front surface includes at least one front inlet aperture and a front outlet aperture. The faucet handle fitting also includes a rear surface opposite the front surface, and the rear surface is configured to be coupled to a waterway connector. The rear surface also includes at least one rear inlet aperture and a rear outlet aperture. An inlet channel extends between each front inlet aperture and a corresponding rear inlet aperture, and an outlet channel extends between the front and rear outlet apertures. The at least one front inlet aperture and the front outlet aperture are offset at an angle relative to the at least one rear inlet aperture and the rear outlet aperture.

According to another exemplary embodiment, a faucet assembly includes a valve to regulate the amount of water able to flow from at least one water source to a faucet outlet, a faucet handle fitting, and a handle coupled to the valve. An orientation of the valve is dependent on a position of the handle, and an amount of water able to flow between the at least one water source and the outlet is controlled by the orientation of the valve. A front surface of the faucet handle fitting is coupled to the valve, the front surface including at least one front inlet aperture in fluid communication with the at least one water source and a front outlet aperture in fluid communication with the faucet outlet. A rear surface of the faucet handle fitting opposite the front surface is coupled to a waterway connector, and the rear surface includes at least one rear inlet aperture and a rear outlet aperture. Each front inlet aperture is in fluid communication with a corresponding rear inlet aperture via an inlet channel, and the front and rear outlet apertures are in fluid communication via an outlet channel. The at least one front inlet aperture and the front outlet aperture are offset at an angle relative to the at least one rear inlet aperture and the rear outlet aperture.

According to another exemplary embodiment, a faucet assembly includes a faucet spout mounted to a mounting surface, a valve to regulate the amount of water able to flow from a first water source and a second water source to a faucet outlet, a handle coupled to the valve, and a faucet handle fitting. The faucet handle is rotatable between an upward twelve o'clock position and a forward horizontal position. An orientation of the valve is dependent on a position of the handle, and an amount of water able to flow between the at least one water source and the outlet is controlled by the orientation of the valve. A front surface of the faucet handle fitting is coupled to the valve, the front surface including a first front inlet aperture in fluid communication with the first water source, a second front inlet aperture in fluid communication with the second water source, and a front outlet aperture in fluid communication with the faucet outlet. A rear surface of the faucet handle fitting opposite the front surface abuts against a waterway connector, the rear surface including at least one rear inlet aperture and a rear outlet aperture. Each front inlet aperture is in fluid communication with a corresponding rear inlet aperture via an inlet channel, and the front and rear outlet apertures are in fluid communication via an outlet channel. When the handle is in the twelve o'clock position, the first front inlet aperture is in fluid communication with the first water source, and when the handle is rotated from the twelve o'clock position to the forward horizontal position, the second front inlet aperture is in fluid communication with the second water source.

According to another exemplary embodiment, a fitting for a faucet handle includes a front surface configured to be coupled to a valve, and the front surface includes at least one front inlet aperture and a front outlet aperture. The faucet handle fitting also includes a rear surface opposite the front surface, and the rear surface is configured to be coupled to at least one water supply. The rear surface also includes at least one rear inlet aperture and a rear outlet aperture. An inlet channel extends between each front inlet aperture and a corresponding rear inlet aperture, and an outlet channel extends between the front and rear outlet apertures. The inlet and outlet channels are helical relative to a body portion of the faucet handle fitting.

According to another exemplary embodiment, a method of modifying a range of motion for a faucet handle may include removing a first faucet handle fitting and replacing the first faucet handle fitting with a second faucet handle fitting. The second faucet handle fitting defines a range of motion for the faucet handle that differs from a range of motion defined by the first faucet handle fitting.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the faucet handle fitting as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fitting for a faucet handle, comprising:
a body having an interior wall disposed within the body, the interior wall having a plurality of apertures;
wherein each aperture has at least a first opening and a second opening fluidly connected by a channel;
wherein the first opening is angularly offset relative to the second opening; and
wherein at least one of the channels forms a helical path.

2. The fitting of claim 1, wherein the first opening is angularly offset approximately 45 degrees relative to the second opening.

3. The fitting of claim 1, wherein the plurality of apertures includes at least one inlet aperture and at least one outlet aperture.

4. The fitting of claim 1, wherein the plurality of apertures includes at least two inlet apertures, each configured to supply a fluid at a different temperature.

5. The fitting of claim 1, wherein the body on a first side of the interior wall is configured to engage a valve and the body on a second opposite side of the interior wall is configured to engage a waterway connector.

6. The fitting of claim 5 further comprising:
at least one arm extending from the body;
wherein the at least one arm is configured to engage the waterway connector.

7. The fitting of claim 1, wherein the body is cylindrical.

8. A faucet assembly, comprising:
a fitting, including:
a body having an interior wall disposed within, the interior wall having a plurality of apertures;
wherein each aperture has at least a first opening and a second opening fluidly connected by a channel; and
wherein the first opening is angularly offset relative to the second opening;
a valve fluidly connected to the fitting;
a handle coupled to the valve; and
at least one arm extending from the body;
wherein the valve regulates a fluid flowing from at least one fluid source to a faucet outlet based on the orientation of the handle;
wherein the body on a first side of the interior wall is configured to engage the valve and the body on a second opposite side of the interior wall is configured to engage a waterway connector; and
wherein the at least one arm is configured to engage the waterway connector.

9. The faucet assembly of claim 8, wherein the orientation of the handle regulates the rate of fluid flowing through the faucet outlet.

10. The faucet assembly of claim 8, wherein the orientation of the handle regulates the temperature of fluid flowing through the faucet outlet.

11. The faucet assembly of claim 8, wherein at least one of the channels forms a helical path.

12. The faucet assembly of claim 8, wherein the first opening is angularly offset approximately 45 degrees relative to the second opening.

13. The faucet assembly of claim 8, wherein the plurality of apertures includes at least one inlet aperture and at least one outlet aperture.

14. The faucet assembly of claim 8, wherein the plurality of apertures includes at least two inlet apertures, configured to supply fluid at different temperatures.

15. A fitting for a faucet handle, comprising:
a body having an interior wall disposed within the body, the interior wall having a plurality of apertures;
wherein each aperture has at least a first opening and a second opening fluidly connected by a channel;
wherein the first opening is angularly offset relative to the second opening; and wherein the plurality of apertures includes at least one inlet aperture and at least one outlet aperture.

16. The fitting of claim 15, wherein the first opening is angularly offset approximately 45 degrees relative to the second opening.

17. The fitting of claim 15, wherein the plurality of apertures includes at least two inlet apertures, each configured to supply a fluid at a different temperature.

18. The fitting of claim 15, wherein the body on a first side of the interior wall is configured to engage a valve and the body on a second opposite side of the interior wall is configured to engage a waterway connector.

19. The fitting of claim 18 further comprising:
at least one arm extending from the body;
wherein the at least one arm is configured to engage the waterway connector.

20. The fitting of claim 15, wherein the body is cylindrical.

\* \* \* \* \*